(12) United States Patent
Pong et al.

(10) Patent No.: US 6,994,885 B2
(45) Date of Patent: Feb. 7, 2006

(54) OPTICAL FILTER COMPRISING SOLAR BLIND DYES AND UV-TRANSPARENT SUBSTRATES

(75) Inventors: Richard G. S. Pong, Silver Spring, MD (US); Steven R. Flom, Temple Hills, MD (US); James S. Shirk, Alexandria, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 25 days.

(21) Appl. No.: 10/979,853

(22) Filed: Nov. 3, 2004

(65) Prior Publication Data

US 2005/0084666 A1   Apr. 21, 2005

Related U.S. Application Data

(62) Division of application No. 10/068,506, filed on Feb. 8, 2002, now Pat. No. 6,858,289.

(51) Int. Cl.
   *B05D 5/06*   (2006.01)
   *B32B 3/26*   (2006.01)
   *B29D 11/00*  (2006.01)

(52) U.S. Cl. .................. 427/162; 427/163; 264/1.1; 264/2.7; 264/241; 264/319; 428/304.4; 428/312.6; 428/314.2; 428/426; 428/696; 428/307.3; 917/DIG. 1

(58) Field of Classification Search ............. 428/304.4, 428/312.6, 314.2, 426, 696, 307.3; 977/DIG. 1; 427/162, 163; 264/2.7, 241
See application file for complete search history.

(56) References Cited

U.S. PATENT DOCUMENTS

| | | | |
|---|---|---|---|
| 4,317,751 A * | 3/1982 | Kraushaar et al. | .......... 252/582 |
| 5,071,227 A | 12/1991 | Dowd | |
| 5,202,786 A | 4/1993 | Boyle et al. | |
| 5,271,872 A | 12/1993 | Sallavanti et al. | |
| 5,574,286 A | 11/1996 | Huston et al. | |
| 5,805,326 A | 9/1998 | Snow et al. | |
| 5,972,544 A | 10/1999 | Carr et al. | |
| 6,016,178 A | 1/2000 | Kataoka et al. | |
| 6,126,869 A | 10/2000 | Haaland | |
| 6,157,503 A | 12/2000 | Knapp | |

OTHER PUBLICATIONS

J. A. Welch et al., "Preparation of an Ultraviolet Optical Filter Component Composed of an Organic Dye in a Polymeric Thin Film," NRL Memorandum Report 6854, Jul. 29, 1991.

* cited by examiner

*Primary Examiner*—Ling Xu
(74) *Attorney, Agent, or Firm*—John J. Karasek; George A. Kap

(57) ABSTRACT

The invention provides an optical filter comprising:
   a. an organic, solar blind filter dye; and
   b. a UV-transparent, non-scattering and chemically stable substrate.

The substrate may be a UV-transparent nanoporous silica glass solid having pores that are substantially filled with a UV-transparent solvent, which has been selected to dissolve said dye and also to match the refractive index of the nanoporous silica glass solid. Alternatively, the substrate may be a UV-transparent inorganic salt compressed to form a solid body. The invention also provides for methods of making these embodiments and an optical device comprising such an optical filter. The filter provides an efficient solar blind filter that is chemically and dimensionally stable.

10 Claims, 7 Drawing Sheets

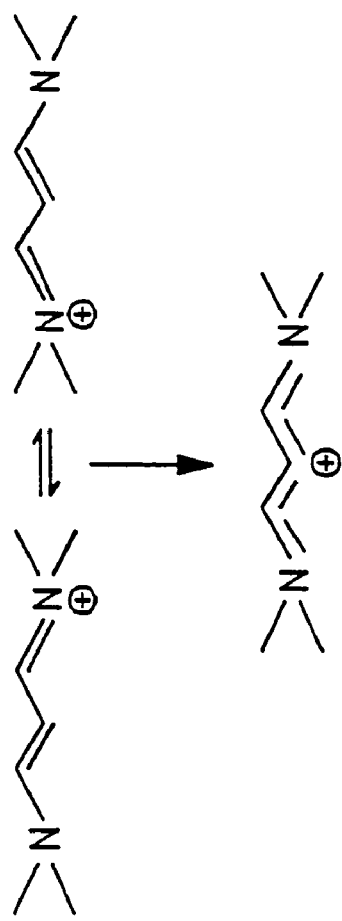
FIG. 4A
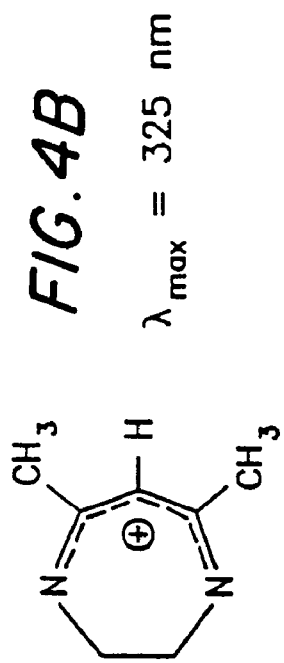
FIG. 4B
$\lambda_{max} = 325$ nm
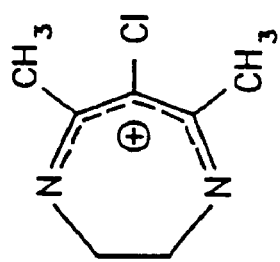
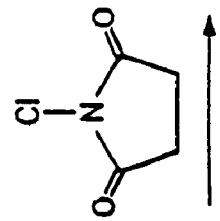
FIG. 4C
$\lambda_{max} = 346$ nm
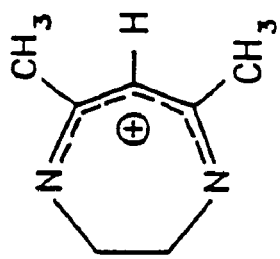

OPTICAL FILTER COMPRISING SOLAR BLIND DYES AND UV-TRANSPARENT SUBSTRATES

This is a divisional application of copending application Ser. No. 10/068,506 filed on Feb. 8, 2002 now U.S. Pat. No. 6,858,289. The entire contents of application Ser. No. 10/068,506 are incorporated herein by reference.

BACKGROUND OF THE INVENTION

1. Field of the Invention

The present invention relates to selective optical filtration in the ultraviolet region of the spectrum. More particularly, the invention relates to the incorporation of organic dyes, which block unwanted ultraviolet (UV) wavelengths, in substrates that offer good transparency in the UV region of the electromagnetic spectrum to wavelengths as short as 200 nm.

2. Description of Related Art

Optical filters are passive components whose basic function is to define or improve the performance of optical systems. Applications of optical filters generally can be as diverse as anti-glare computer screens, laser devices such as ophthalmic surgical lasers, sighting devices, etc. Many applications and instruments exist where optical filters are used to tune the optical behavior of light in the ultraviolet range (typically wavelengths shorter than 400 nm). Some applications include water purification, blood chemistry analysis, and the chemical evaluation of foods, pollutants, gases, etc. More specifically, optical filters can be used in many biomedical analysis systems, e.g., to detect the presence of a specific marker (such as an enzyme) in a blood or tissue sample. The marker is customarily identified by fluorescence upon exposure of the sample to a detection wavelength, using a filter that specifically does not autofluoresce.

Particular applications for solar blind filters include inspection of high voltage transmission lines for corona and partial discharges, detection of forest fires, detection of fires in industrial installation, missile plume detection, monitoring Cherenkov light, monitoring lightning events during thunderstorms, detecting ultraviolet laser sources, such as excimer lasers or frequency quadrupled Nd:YAG lasers used as LIDAR sources, and ultraviolet telescope detectors for space platforms. The detection of ultraviolet (UV) light during daylight conditions is an important problem for both commercial and military applications. Many important phenomena produce UV radiation, including fires and flames, rocket and jet engine exhausts, electrical corona and electrical discharges on high tension wires, lightning, and the plasma surrounding an object that is entering the earth's atmosphere at a high velocity.

For example, corona discharges in air emit light mainly in the 230–405 nm range. The most intense emissions are the 317, 337 and 357 nm lines. These emission lines are, however, very weak relative to daytime background solar radiation. It is, therefore, not possible to use these emission lines to image corona during the daytime, even when narrow bandpass filters and applying background subtraction method. Although the corona emission in the solar blind range is much weaker than the UVb and UVa lines, by using a truly solar blind filter that almost totally blocks the background radiation outside the bandpass, UV images of high contrast can be obtained.

As another example, strike and interceptor aircraft operating in a hostile environment can be detected positively by early warning systems detecting UV from the missile plume, but must be sensitive in the region of the missile plumes' UV radiation, from about 230–280 nanometers, to reduce false alarms. Further, such detectors should have a large area, wide field of view.

Photons of ultraviolet radiation are more energetic than photons of visible light and are therefore theoretically easier to detect. Although the sun always emits a large quantity of radiation at a wavelength below about 290 nm to less than 285 nm, such radiation is usually efficiently absorbed by the atmosphere, specifically by ozone in the stratosphere. Thus, as shown in FIG. 1, the solar radiation reaching the earth surface drops rapidly as the wavelength decreases. Accordingly, one advantage of detection in the low wavelength range of the UV is the relative absence of background radiation; weak UV signals in this band can be imaged with a relatively high signal to background ratio, especially at night.

However, due to the extremely high actinic flux of solar radiation, it is still difficult to design a very sensitive optical system that can be used in broad daylight to detect very low levels of UV radiation. The spectral distribution of radiation from the sun is similar to that of a 6,000 degree black-body radiator, and the detection of an ultraviolet emission source, such as a fire or a rocket plume, during the day is complicated even by the modest amount of UV light emitted by the sun that is not fully absorbed by the earth's atmosphere. A solar blind filter may typically be defined as a filter that blocks both visible and the longer UV wavelengths (UVa and UTb) and only transmits UV wavelengths below about 285 nm (sometimes referred to as UVc), as shown in FIG. 1. Solar blind signal-to-noise ratios are maximized when the actinic flux of solar radiation is completely excluded from the sensor. As the wavelength of light becomes shorter in the UV range, prior optical filters suffer from many disadvantages, such as poor optical performance, limited physical longevity, high autofluorescence, poor imaging quality of the transmitted radiation, and transmitted wavelength instability.

One approach has been to use absorption type materials using large single crystals. For example, U.S. Pat. No. 4,731,881 discloses a chemical filter comprising a single crystal nickel sulfate hexahydrate crystal. However, this material, as well as filters using rare earth ions as crystalline hosts, are very high in cost because of the need to grow single crystals. Moreover, they typically have poor thermal and moisture stability.

Some filters incorporate organic dyes in polymeric substrates, such as polyvinyl alcohol. For example, U.S. Pat. No. 4,731,881 also describes the use of an organic dye, referred to as Cation X, contained in a polyvinyl alcohol film, to provide the desired UV bandpass characteristics. U.S. Pat. No. 6,126,869 discloses a solar blind optical filter that includes a carrier material and the salt of a dithioic acid of the formula $RCS_2^-X^+$, wherein R is an organic substituent that does not absorb ultraviolet light at wavelengths between 260 nanometers and 300 nanometers, and X is a counterion. However, the polyvinyl alcohol substrate in which the organic dye is incorporated in these filters is also susceptible to changes in humidity and to environmental degradation.

Still other means include glass substrates, but glass materials often result in broader absorptions than desired, and may tend to fluoresce. Thus, they are not usually desirable as filter materials for optical reasons. Further, they require fabrication at high temperatures to solvate materials to be incorporated in the glass. Specifically, even if UV-transparent glass were used, it would not be possible to dissolve the organic dyes desired into UV transparent glass substrate, because the organic dyes would be unstable at the high processing temperatures required.

U.S. Pat. No. 6,126,869 also discloses that an organic dye may be absorbed onto silica nanospheres or immobilized in a gel or glass matrix. However, these substrates would either produce an unacceptable degree of scattering or would exhibit some of the same problems experienced with glass discussed above.

Layered dielectric or rugate filters can also be used as wavelength-selective filters in the UV region of the spectrum, but they have a strong angular dependence to the filtering action and are also expensive to produce. Therefore, they would not be acceptable for tracking UV-emitting sources over a large area or wide angle of view.

SUMMARY OF THE INVENTION

According to a first aspect of the present invention, there is provided an optical filter comprising:
  a. an organic, solar blind filter dye; and
  b. a UV-transparent, non-scattering and chemically stable substrate.

One method of making such an optical filter comprises the steps of:
  (1) selecting a nanoporous silica glass solid that is substantially UV-transparent;
  (2) dissolving the dye in a UV-transparent solvent, which has been selected to (i) form a solution of the dye and (ii) to match the refractive index of the nanoporous silica glass solid;
  (3) allowing the solution to permeate the porous glass solid to form a UV-transparent, non-scattering substrate incorporating the dye.

A second method for making the optical filter of the invention comprises the steps of:
  (1) grinding together a IV-transparent inorganic salt with the dye to form a mixture; and
  (2) compressing the mixture to form a solid body.

The filters of the invention typically absorb UV radiation having wavelengths between about 300 and 400 nm, and transmit UV radiation having a wavelength below about 300 nm. The filters may be used to make a wide variety of optical devices.

BRIEF DESCRIPTION OF THE DRAWINGS

FIG. 4A shows a schematic representation of the cyanine dye π-electronic structure.

FIG. 4B shows the structure of a first solar blind dye incorporating the cyanine structure.

FIG. 4C shows a schematic representation of the modification of the first solar blind dye to form a second solar blind dye incorporating the cyanine structure.

DETAILED DESCRIPTION OF THE INVENTION

Organic Dye

Figure 1:
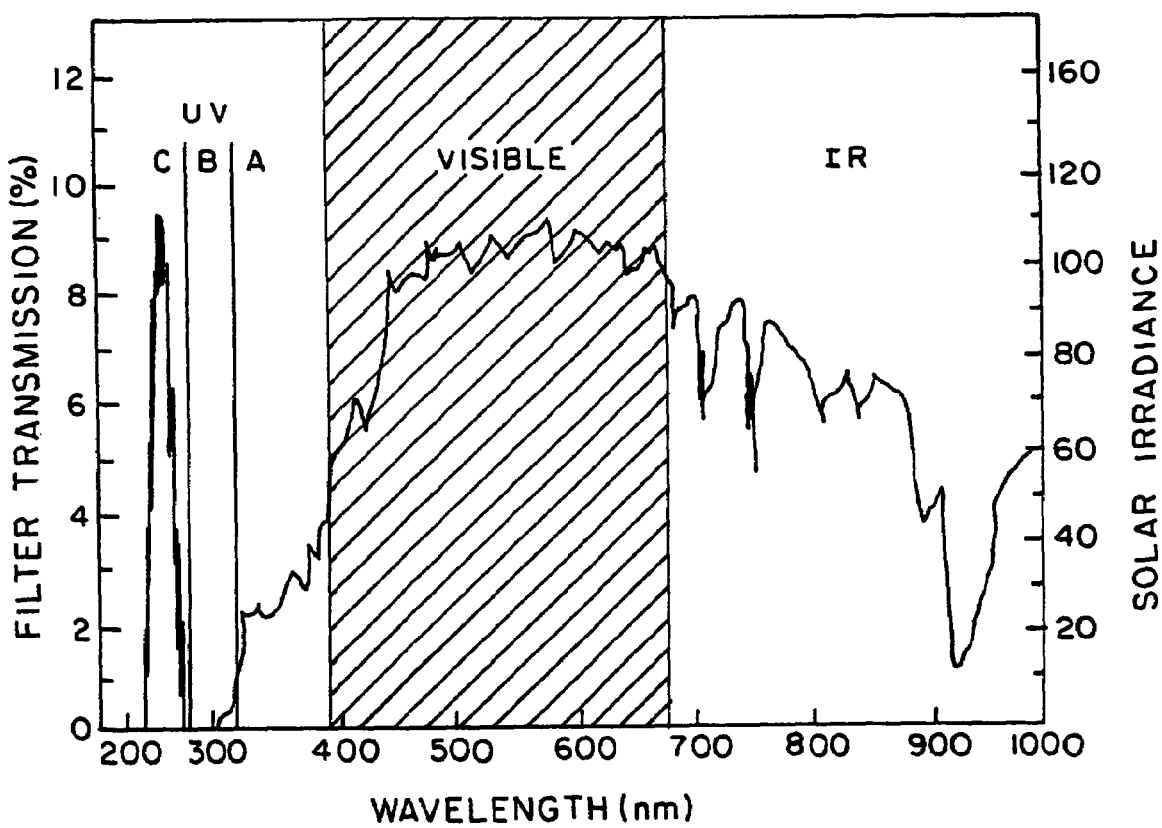
FIG. 1 is a plot of actinic flux of solar radiation by wavelength and the transmittance of a typical solar blind filter in a polymer substrate.

The optical filter of the invention comprises an organic, solar blind filter dye. In other words, the dye transmits ultraviolet light having wavelengths below a selected ultraviolet wavelength, but also have a very sharp wavelength cutoff to substantially block wavelengths within ultraviolet wavelengths longer than the selected wavelength, such as those received in solar radiation and not blocked by the earth's atmosphere. Suitable dyes generally include those which transmit ultraviolet wavelengths below about 285 nm and to block wavelengths between about 285 nm and about 700 nm. The dye may also pass wavelengths longer than about 700 nm. The dyes are preferably also relatively stable, both chemically and thermally, for ease of processing and durability of the filter of the invention.

Useful classes dyes include, for example, cyanine dyes and dithioic dyes. As shown in FIG. 4A, cyanines are characterized by an odd-numbered chain of carbon atoms of variable length, bracketed by nitrogen atoms. The structure features an extended π-electronic structure containing an even number of electrons that is one less than the odd number of atoms in the chain. This π-structure allows delocalization over the chain and dominates the optical properties of the dye. The π-π* transition is-intense and narrow, having absorption extinction coefficients ranging from tens to hundreds of thousands, and the transition energy can be tuned from the ultraviolet to the near infrared, as a function of both chain length and substituents on the chain (such as substituting a chlorine atom for a hydrogen atom). Examples of cyanine dyes in the present invention expected to be useful include linear cyanines; and the like. A particularly preferred class of cyanine dyes, however, are the cyclic cyanine dyes. Even more preferably, the cyclic cyanine dye is a 2,7-dialkyl-3,6-diazacyclohepta-1,6-diene where alkyl can be methyl, ethyl, n-propyl, isopropyl, sec-butyl, tert-butyl, n-hexyl, dodecyl, and the like.

Because the cyanines have one less 7-electron than chain atoms, the molecule is a positively charged ion and is accompanied by a negatively charged counterion. Possible counterions include ClO$^-$ (perchlorate), fluoride, bromide, iodide, chloride and the like.

A particularly preferred cyanine solar blind dye is 2,7-dimethyl-3,6-diazacyclohepta-1,6-diene perchlorate, the structure of which is shown by FIG. 4B. Its seven atom ring structure features π-delocalization over five of the ring atoms. This relatively short cyanine chain results in a π-π* transition in the UV region centered at 325 nm when incorporated into a polyvinyl thin film. The blue edge of this absorption occurs at 290 nm, which cuts into the desired 220–300 nm transmission window. FIG. 4C shows that, by using N-chlorosuccinimide as a chlorinating agent, the chloride homolog, an even more preferred cyanine dye, can be produced. The chlorine atom, substituted for hydrogen in the middle of the cyanine chain (in the 1-position), causes a red shift in the π-π* transition to 346 nm (in polyvinyl alcohol film). This perturbation is enough to provide a sharp red edge cutoff for the desired 220–300 nm transmission window.

The preparation of 2,7-dimethyl-3,6-diazacyclohepta-1,6-diene perchlorate is described in the open literature. Alternatively, a cost and time effective recourse is to purchase this dye from any of several commercial sources. The chlorination process depicted in FIG. 4C can be described in general terms as follows: Roughly equimolar amounts of the 2,7-dimethyl-3,6-diazacyclohepta-1,6-diene perchlorate starting material and N-chlorosuccinimide are combined and refluxed for several hours in a common solvent, such as carbon tetrachloride. The solvent is then removed under vacuum, and the crude chlorinated product is purified by washing with ethyl ether in a Soxhlet extractor. The end product may be further purified by conventional means, such as by recrystallization in a appropriate solvent, extraction, chromatographic separation, and the like methods known in the art.

Another particularly useful class of solar blind dyes are dithioic dyes, such as those having the formula $RCS_2^-X^+$, wherein R is H or alkyl and X is a cation. When R is alkyl, it may be methyl, ethyl, n-propyl, isopropyl, tert-butyl, n-pentyl, octyl, dodecyl, cyclohexyl and the like. However, when applicable, the alkyl group is preferably a methyl, ethyl, isopropyl or tertiary butyl group. The cation X suitable for use with dithioic dyes of this type include, for example, alkali metals such as $Na^+$, $K^+$, $Li^+$, $Cs^+$, $Rb^+$ and the like; tetraalkylammonium cations such as $N(CH_3)_4^+$, $N(C_2H_5)_4^+$ and the like; heterocyclic cations, such as $C_5H_{10}NH_2^+$ (piperidinium); and the like. However, $Na^+$, $N(C_2H_5)_4^+$ and $C_5H_{10}NH_2^+$ (piperidinium are particularly preferred cations. Variation of the cation primarily influences the chemical stability of the dye material. For example, sodium salts are typically more sensitive to oxidation than the corresponding tetraalkylammonium salts.

Figure 2:
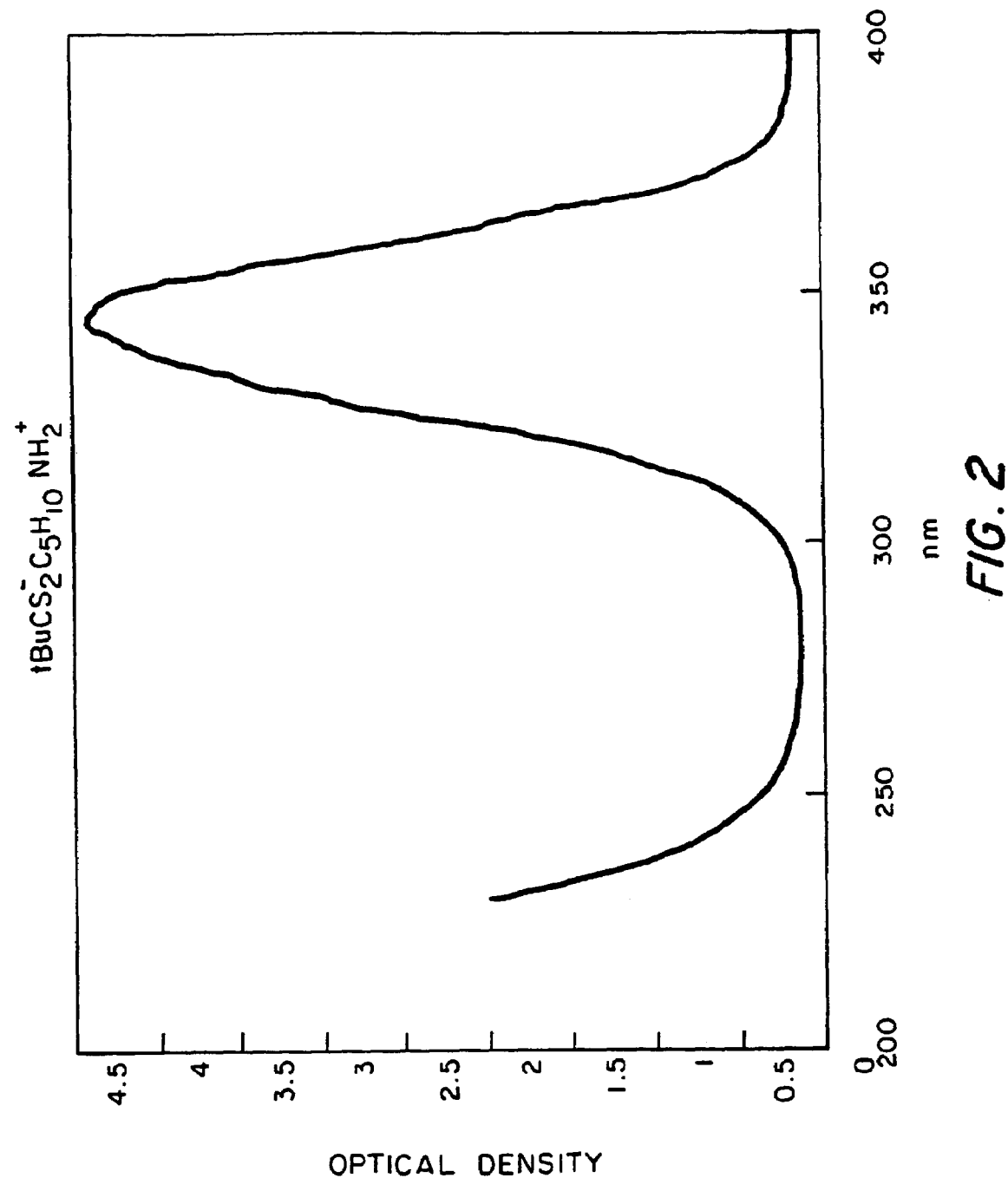
FIG. 2 is a plot of the optical density by wavelength of the solar blind dye t-buCS$_2$ (piperidine salt) in polyvinyl alcohol.
Figure 3:
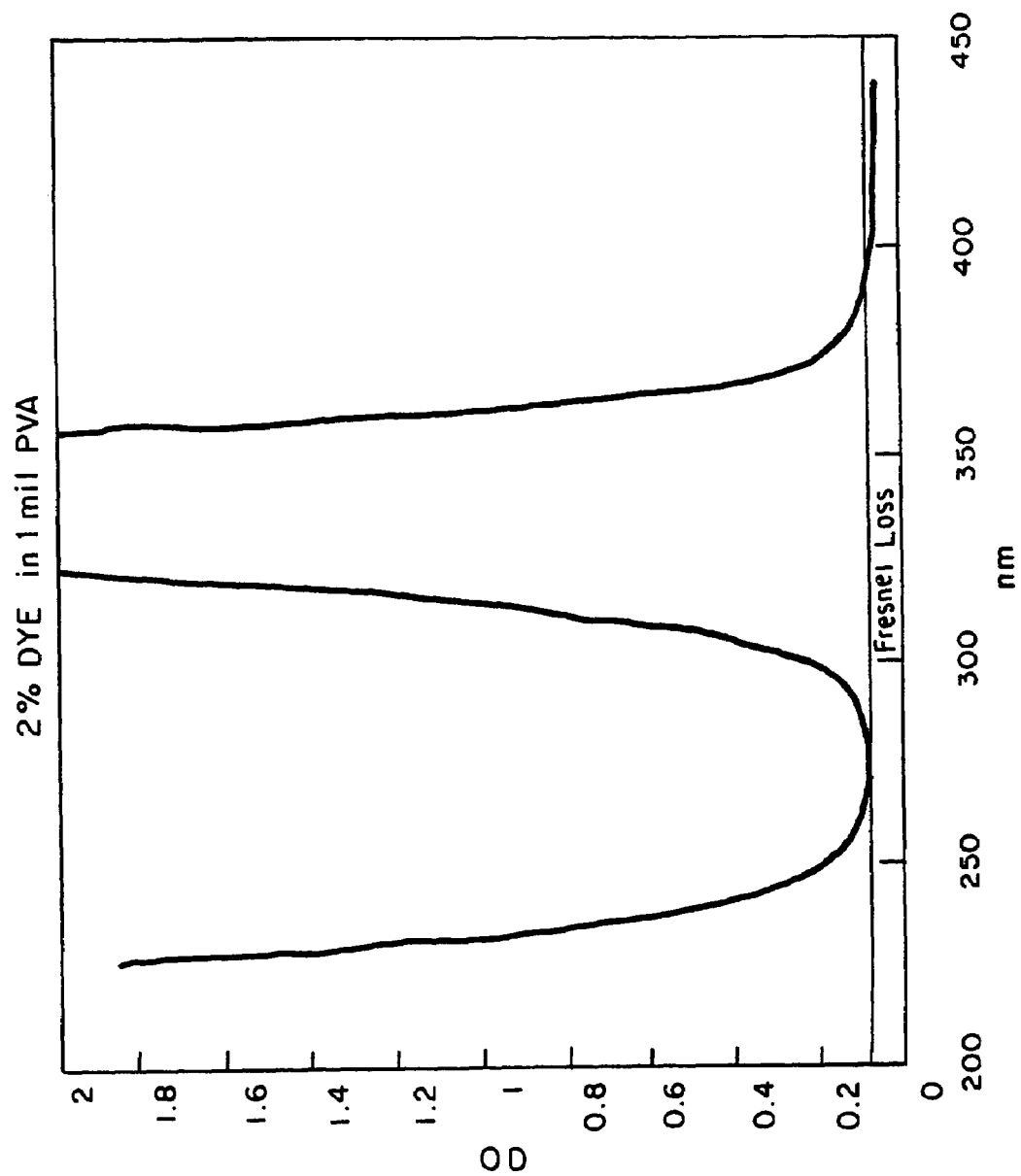
FIG. 3 is a plot of the optical density by wavelength of another solar blind dye, i-PrCS$_2$N(C$_2$H$_5$)$_4$, in polyvinyl alcohol.

Examples of the spectra of such dyes in polyvinyl alcohol are shown in FIGS. 2 and 3. Similar spectra are found with slight shifts as the substituent R is varied or the solvent is changed, as will be familiar to those practiced in the art of organic chemistry.

The synthesis of dithioic acid salts is familiar to those practiced in the art of organic chemistry. For example, such a process is described in Kato et al., *Z. Naturforsch.* 33b, 976–77 (1978). Other methods of synthesizing such dyes are described in Paquer, *Bull. chem. Soc. Fr.,* 1439 (1975) and Jansons, *Russ. Chem. Rev.* 45:1035 (1976). Viable synthetic options include the reduction of $CS_2$ by an alkyl Grignard or alkyl lithium reagent, thiolysis of precursors such as $CF_3CN$, or oxidative sulfurization of aromatic aldehydes.

A variety of solar blind dyes are also commercially available as polyvinyl alcohol thin films from Ofil Ltd., Kiryat Weizmann Science Park, Building #13A, POB. 4016, Nes-Ziona 70400, Israel, and the following data about such films are available from links provided at the Ofil Ltd website (www.ofil.co.il). Specifically, the solar blind dye shown in FIG. 1 is described as having the following spectral characteristics and specifications:.

| UV Transmittance | |
| --- | --- |
| Wavelength (peak) | 260 nm |
| Transmittance (peak) | >12% |
| Bandwidth (FWHM) | 15 nm |

| Out of Band Blocking | |
| --- | --- |
| 290 nm | OD > 12 |
| 300–770 nm | OD > 12 |
| 770–900 nm | OD > 5 |

The "SB-BDF" filter marketed by Ofil Ltd. exhibits the following characteristics:

| Typical UV Transmittance | |
| --- | --- |
| Wavelength (peak) | 264 ± 1 nm |
| Transmittance (peak) | 15% |
| Bandwidth (FWHM) | 17 ± 2 nm |

| Typical Out of Band Transmission | |
| --- | --- |
| 290 nm | $<10^{-5}$% |
| 300–750 nm | $<1 \times 10^{-10}$% |
| 750–1100 nm | $<2 \times 10^{-4}$% |

The following spectral data has been provided for "SB-274" and "BP-308" filters incorporating solar blind dyes in polyvinyl alcohol.

| Ofil "SB-274" UV Transmission | |
| --- | --- |
| Wavelength (peak) | 274 ± 1 nm |
| Transmittance (peak) | 13% |
| Bandwidth (FWHM) | 16 ± 1 nm |

| "SB-274" Out of Band Transmission | |
| --- | --- |
| 287 nm | $<10^{-4}$% |
| 300 nm | $<10^{-9}$% |
| 300–650 nm | $<10^{-8}$% |
| 650–800 nm | $<10^{-5}$% |

| Ofil "BP-308" UV Transmission | |
| --- | --- |
| Wavelength (peak) | 308 ± 1 nm |
| Transmittance (peak) | 20% |
| Bandwidth (FWHM) | 18 ± 1 nm |

| "BP-308" Out of Band Transmission | |
| --- | --- |
| 340 nm | <10$^{-4}$% |
| 300–750 nm | <10$^{-8}$% |
| 750–900 nm | <10$^{-4}$% |

Substrate

The substrate for the filter of the invention may be any UV-transparent, non-scattering and chemically stable substrate. However, two forms of substrate are particularly preferred.

The first preferred substrate is a UV-transparent nanoporous silica glass solid, preferably unitary, having pores that are substantially filled with a UV-transparent solvent, the solvent being selected to dissolve the dye and to match the refractive index of the nanoporous silica glass solid. Examples of such nanoporous silica glass solids include porous glass matrices sold under the trade name Vycor, e.g., 2930 Vycor. The porous glass matrix may be partially consolidated or may be allowed to remain completely porous. Microporous glass may be useful under some circumstances, but is less desirable because the larger size cavity imposes tighter tolerances with respect to matching the index with a suitable solvent. Nanoporous materials, on the other hand, exhibit greater tolerance with respect to matching both thermal and reflection indices, thereby avoiding potential mismatch problems.

When the substrate of the invention comprises a UV-transparent nanoporous silica glass solid, the pores of the solid must be filled with UV-transparent solvent, which has been specifically selected to both (i) dissolve the organic dye and (ii) to match the refractive index of the nanoporous silica glass solid. Therefore, once the solvent has completely permeated the micropores of the solid, optical scattering is prevented. Any solvent that meets these criteria (transparent to UV light and possessing a high index of refraction) may be used, such as dialkyl phthalates, dialkyl succinates, other dialkyl esters, and the like.

Preferably the solvent is non-volatile to obviate the need for sealing the substrate once it is formed, although an optically transparent seal, such as SiO$_2$, may be used in case the solvent is somewhat volatile. Most preferably, the solvent is dibutyl phthalate or dibutyl succinate.

The second preferred substrate for the invention comprises a UV-transparent inorganic salt compressed to form a solid body. Any such salt may be used but, preferably, the inorganic salt is a halide salt of an alkali metal (Group 1a) or an alkaline earth metal (Group 2a). Preferred halide salts are the fluoride, chloride, bromide or iodide salts. The alkali metal or alkali earth metal used in the salt can vary widely, depending upon UV transparency, flow properties under pressure, tendency to absorb water and compatibility with the incorporated dye. More preferably, however, when the inorganic salt is an alkali metal, it is K or Cs. When the salt comprises an alkaline earth metal, preferably it is Sr. Most preferably, the salt is KBr.

Methods of Making the Filters of the Invention

A preferred method of making the optical filter of the invention comprises the steps of:

(1) selecting a nanoporous silica glass solid that is substantially UV-transparent;

(2) dissolving the dye in a UV-transparent solvent, which has been selected to form a solution of said dye and to match the refractive index of the nanoporous silica glass solid;

(3) allowing said solution to permeate said porous glass solid to form a UV-transparent, non-scattering substrate incorporating said dye.

In the permeation step (3), it should be noted that elevated temperatures, such as in the range of about 20 to about 100° C., preferably about 60° C., help to facilitate the permeation process. Also, for the same reason, it may be helpful to perform the permeation step under conditions of reduced pressure, such as from about 0.1 to about 10.0 Torr.

Alternatively, the dye may be dissolved in a relatively volatile solvent to form a volatile solution, which is allowed to permeate the nanoporous glass solid and then evaporated off, leaving behind microparticles of said dye in the pores of the nanoporous silica glass solid. Examples of the volatile solvent include any relatively volatile solvent that easily absorbs the dye, such as methanol, ethanol, water and the like.

Then, in a second step, a relatively non-volatile, UV-transparent solvent, which has been selected to match the refractive index of the nanoporous glass solid, such as those described above, is allowed to permeate the nanoporous glass solid containing microparticles of said dye until the dye is dissolved. Preferred nonvolatile solvents include dibutyl phthalate and dibutyl succinate.

The second type of substrate used in the invention, the inorganic salt is made by (1) grinding together the UV-transparent inorganic salt of the invention with the dye to form a mixture; and (2) compressing the mixture to form a solid body.

Useful pressures for the compression step vary from about 10,000 to about 50,000 psi, with about 25,000 to 40,000 psi being about typical. The may further comprise the step of coating the solid body with a sealant to ensure chemical and dimensional stability. Acceptable sealants include polydimethylsiloxanes, polyethylenes, polypropylenes, some high molecular weight waxes, and the like.

Characteristics and Modifications of Filter

Preferred configurations of the invention do not require any sealing from ambient conditions, are chemically and thermally stable for extended periods of time, and do not degrade over time or exposure to UV irradiation. Further, they are relatively simple and inexpensive to produce.

The filter of the invention typically absorbs UV radiation having wavelengths between about 300 and 400 nm, and transmits UV radiation having a wavelength below about 300 nm. The optical filter of the invention preferably has an optical transmittance of at least 40% within the desired ultraviolet wavelength range, typically within about 230 nm to 290 nm, preferably about 230 nm to 285 nm.

Preferably, the filter exhibits a light transmission of less than about 0.5% over the wavelength range between about 285 nm and about 350 nm. More preferably, the filter passes ultraviolet light below about 275 nm and blocks wavelengths in the background radiation between about 275 nm and about 700 nm. It is preferred that transmittance output within this range be no greater than about 0.1%. Accordingly, the filter may be further modified to incorporate other dyes to block all visible radiation, such as between about 300 to about 700 nm, or some portion of visible light, such as between 420 and 650 nm. In order to obtain the desired extinction of visible light wavelengths, such as between 320 nm and 380 nm, several optical filters of the invention can be placed in series, as required, or combined with other types of filters to give the desired result.

When assembled into a suitable device, the device preferably detects ultraviolet light successfully at wavelengths below about 290 nm, preferably below about 285 nm, even in the presence of solar illumination or other extraneous illumination above about 290 nm.

EXAMPLES

Example 1

Chlorination of
2,7-Dimethyl1-3,6-diazacyclohepta-1,6-diene Perchlorate

A flask is charged with 0.0135 moles of the 2,7-dimethyl-3,6-diazacyclohepta-1,6-diene perchlorate and 0.0171 moles of N-chlorosuccinimide in 150 ml carbon tetrachloride, and the resulting mixture was refluxed for about 3 hours at 76° C. The resulting mixture contained several milliliters of a yellowish liquid that was immiscible with the nonpolar carbon tetrachloride solvent, which was clear. The yellowish liquid layer was separated off and diluted with distilled water to about four times its initial volume. This water solution was allowed to stand in an open beaker at room temperature for several hours of slow evaporation. Clear, needle-like crystals then precipitated out, and then were filtered off and washed with fresh carbon tetrachloride. A total of three precipitation/filtering cycles were performed on the mixture, with each cycle yielding about 100 mg of high quality crystalline precipitate.

By the fourth cycle, the water-based solvent was nearly gone, and the resulting precipitate was slightly tan colored and noncrystalline. This impure material was transferred to a Soxhlet extractor, where 't was washed with ethyl ether for about 6 hours. Upon cooling of the wash ether to room temperature, more white crystalline produce precipitated and filtered from the ether solution. (The tan material remained in the extractor thimble.)

Each of the above crystal harvests were further purified by dissolving in and recrystallization from a few milliliters of distilled water, resulting in white, needle-like chlorinated crystals that often grew to lengths of several centimeters. Occasionally small portions of the recrystallized material appeared amorphous, and these portions were omitted from the final product collection.

Figure 5:
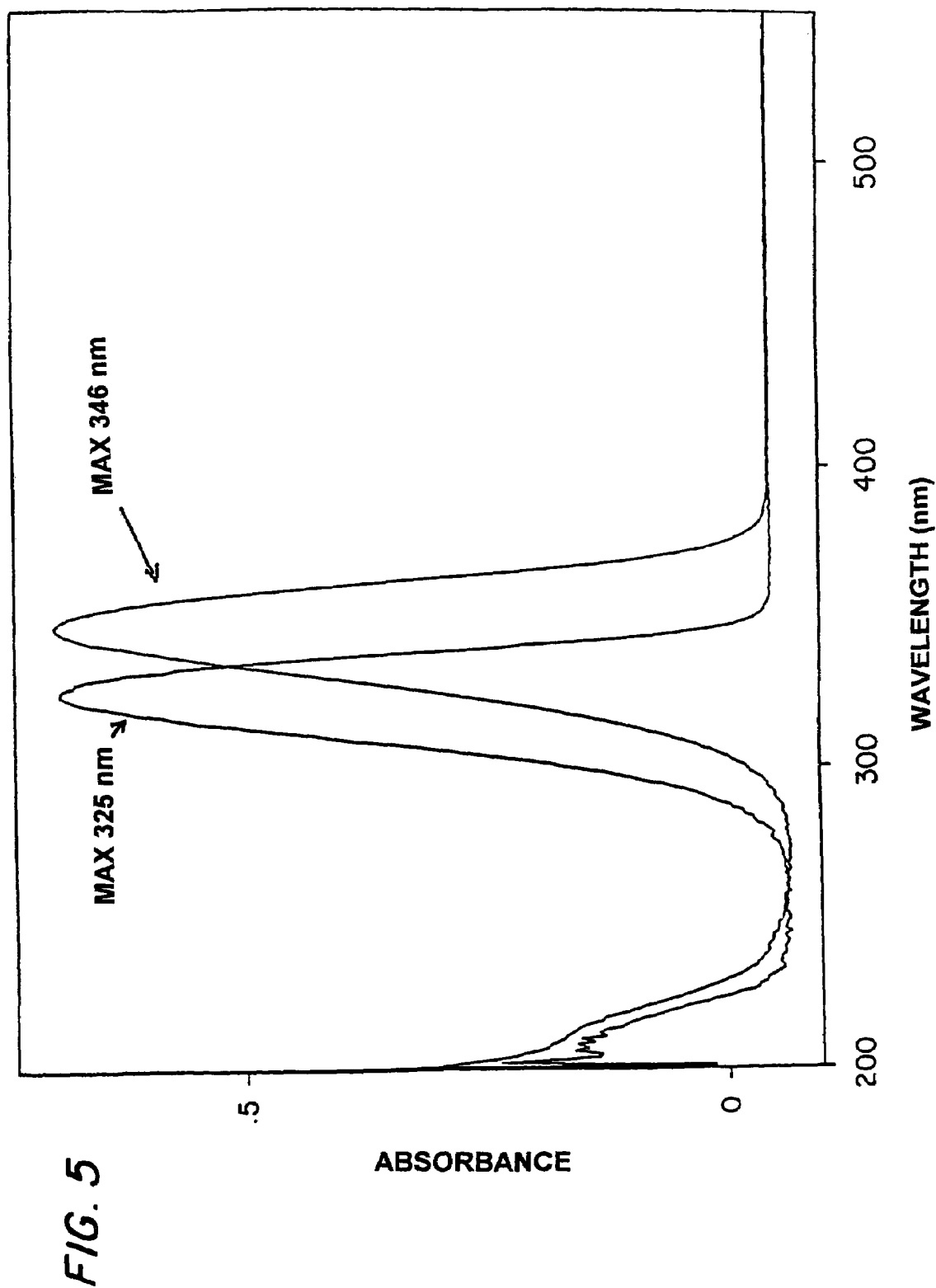
FIG. 5 shows the absorbance spectra for both the first and second solar blind dyes in methanol.

Absorption spectra were made of both the unchlorinated starting material (2,7-dimethyl-3,6-diazacyclohepta-1,6-diene perchlorate) and the chlorinated product in methanol, as shown in FIG. 5. The spectrum of the product features a single absorption maximum at 346 nm with an extinction coefficient of about 20,000 liters per mole-centimeter and a full width at half max of 37 nm. This maximum is red shifted from the 325 nm maximum of the starting material by 21 nm, leaving a clear transmission window between about 300 nm and 220 nm, where solvent absorption begins.

Example 2

Preparation Chlorinated Dye in Polyvinyl Alcohol Thin Films

Figure 6:
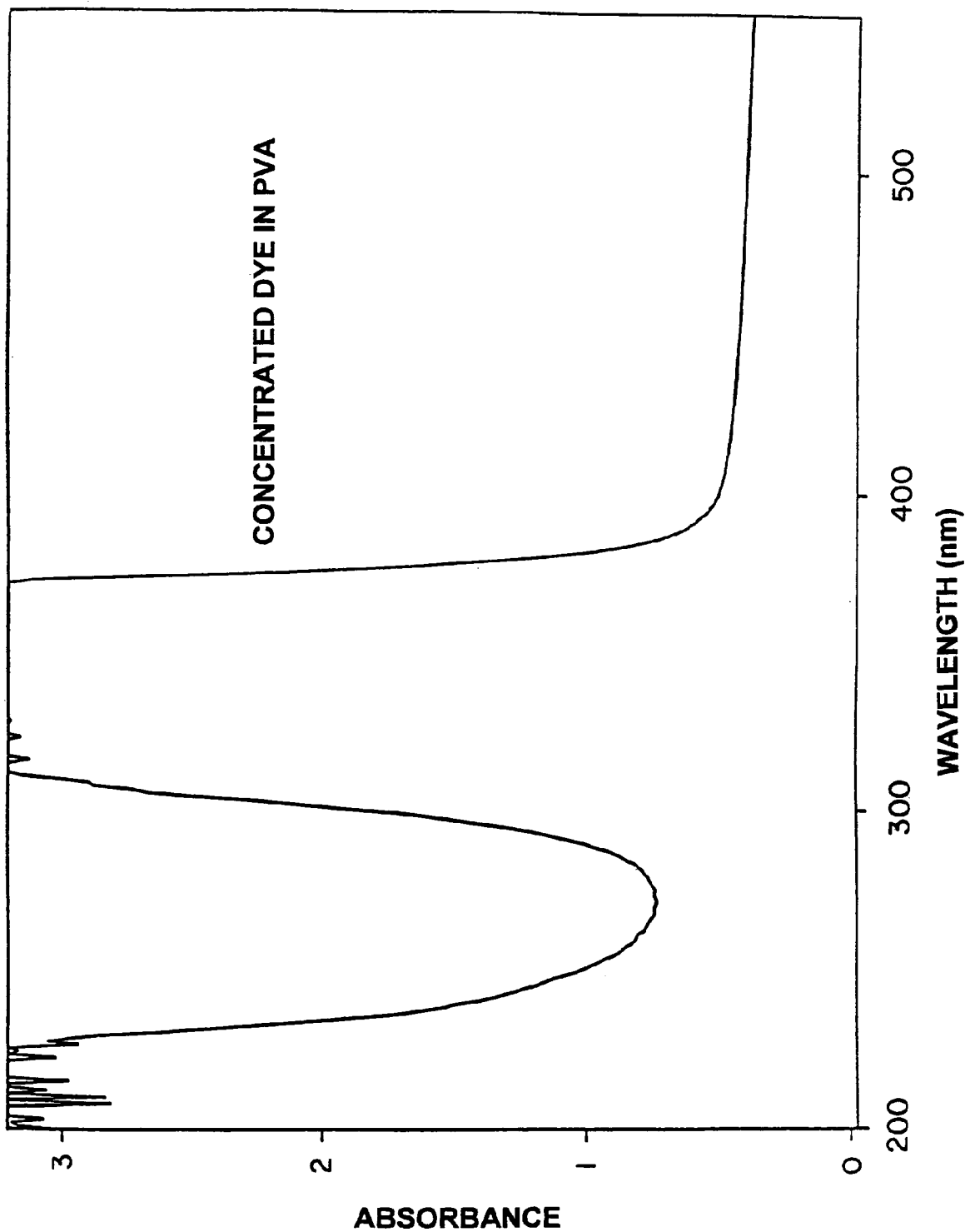
FIG. 6 shows the absorbance spectra for the second solar blind dye in polyvinyl alcohol.

Thin films of polyvinyl alcohol (PVA) were grown on a quartz substrate from the evaporation of water solutions of PVA that also contained optically dense amounts of the chlorinated produce of Example 1. A sufficient dye concentration was needed to provide an absorbance of about 40 OD at the 346 nm maximum. Using Beer's law, i.e., Absorbance=(chromophore extinction coefficient) (concentration) (pathlength), it was calculated that a 40 OD absorbance would required a (concentration)×(pathlength) product of 0.002 moles-cm/liter. The pathlength was determined experimentally by finding the volume of PVA solution needed to coat the substrate and dividing by the area of the substrate. For the PVA solution, this initial pathlength was on the order of 0.4 nm, and thus the desired initial $dy^e$ concentration was 0.05 moles/liter. As the water evaporated and the film formed, the (concentration)×(pathlength) produce remained constant, but the pathlength reduced to 0.05 mm (2 mils) thick. The concentration thereby increased to 0.4 moles/liter, a value that was too high for the limited solubility of the dye in PVA. The chlorinated dye crystallized out of the film to form an optically opaque composition. This problem was alleviated by using more concentrated PVA solutions to increase the film's final thickness. By using water solutions that were saturated in PVA at room temperature (about 1.3 moles PVA/liter), film thicknesses of about 0.1 mm (4 mils) were obtained. FIG. 6 shows the absorbance of this chlorinated dye/PVA film in full scale, establishing that the 220–300 nm window remained fairly optically clear despite the intense adjacent absorbance.

Example 3

Preparation Chlorinated Dye in Porous Glass Substrate

The filter using an organic dye in porous glass was prepared by first drying the Vycor disks overnight at 100° C. The disks were then soaked overnight in a 0.1% aqueous solution of the dye. The disks were then heated on a hot plate to remove the water. The disks were then filled with index matching solvent by immersing them in either diethyl succinate, diethyl phthalate or dibutyl phthalate.

Figure 7A:
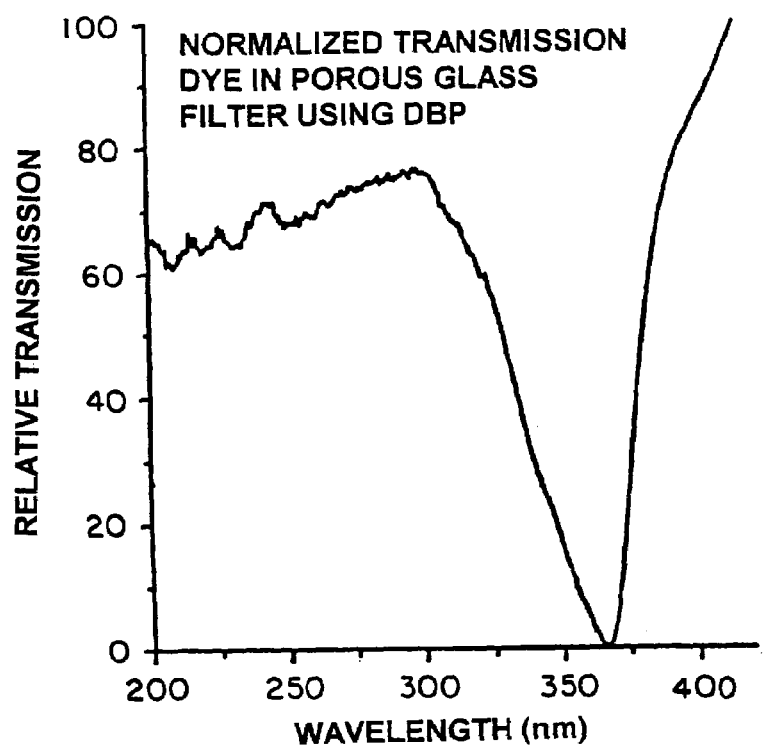
FIG. 7A shows the transmission spectrum for the second solar blind dye in a porous glass filter using a solvent to match the refractive index of the porous glass to prevent scattering.
Figure 7B:
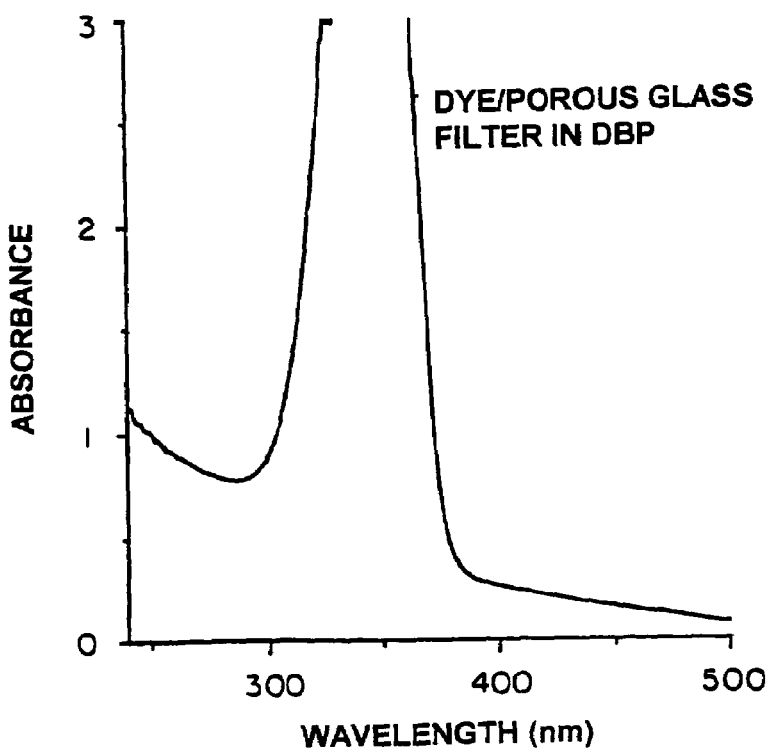
FIG. 7B shows the corresponding absorbance spectrum for the same material.

FIG. 7A illustrates the relative Transmission of a filter of the invention comprising the dye prepared in Example 1 incorporated into a porous glass filter with dibutyl phthalate as a solvent. FIG. 7B shows the corresponding absorbance spectrum. Accordingly, the optical performance of the filter of the invention was substantially equal to that of the same dyes in polyvinyl alcohol. However, the dyes of the invention were significantly more stable under adverse conditions and/or long exposures to ambient conditions.

Example 4

Preparation of Chlorinated Dye in Inorganic Salt Substrate

The filter using the dye in an inorganic salt substrate was prepared by grinding 0.0002 g with 0.20 g of Potassium Bromide using an agate mortal and pestle. Grinding continued until a fine homogenous powder was obtained. The resulting powder was compressed to a clear pellet using an 8 millimeter diameter screw type press. The resulting filter had transparency to 190 nm as expected and the spectrum of the dye was unaltered.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method of making an optical filter comprising:
   a. an organic, solar blind filter dye; and
   b. a UV-transparent, non-scattering and chemically stable substrate, comprising the steps of:
      (1) selecting a nanoporous silica glass solid that is substantially UV-transparent;
      (2) dissolving said dye in a UV-transparent solvent, which has been selected to form a solution of said dye and to match the refractive index of the nanoporous silica glass solid;
      (3) allowing said solution to permeate said porous glass solid to form a UV-transparent, non-scattering substrate incorporating said dye.

2. The method of claim 1 wherein said UV-transparent solvent comprises dibutyl phthalate or dibutyl succinate.

3. A method of making an optical filter comprising:
   a. an organic, solar blind filter dye; and
   b. a UV-transparent, non-scattering and chemically stable substrate, comprising the steps of:
      (1) selecting a nanoporous silica glass solid that is substantially UV-transparent;
      (2) dissolving said dye in a relatively volatile solvent to form a volatile solution;
      (3) allowing said volatile solution to permeate said nanoporous glass solid;
      (4) evaporating off the relatively volatile solvent, leaving behind microparticles of said dye in the pores of the nanoporous silica glass solid; and
      (5) allowing a relatively non-volatile, UV-transparent solvent, which has been selected to match the refractive index of the nanoporous glass solid, to permeate the nanoporous glass solid containing microparticles of said dye until said dye is dissolved in the non-volatile solvent, thus forming a UV-transparent, non-scattering substrate incorporating said dye.

4. The method of claim 3 wherein said relatively volatile solvent is an alkanol, a halogenated hydrocarbon or water.

5. The method of claim 3 wherein said non-volatile, UV-transparent solvent comprises dibutyl phthalate or dibutyl succinate.

6. A method of making an optical filter comprising:
   a. an organic, solar blind filter dye; and
   b. a UV-transparent, non-scattering and chemically stable substrate, comprising the steps of:
      (1) grinding together a UV-transparent inorganic salt with said dye to form a mixture;
      (2) compressing said mixture to form a solid body.

7. The method of claim 6 wherein said UV-transparent inorganic salt is a halide salt of an alkali metal (Group 1a) or an alkaline earth metal (Group 2a).

8. The method of claim 6 wherein said inorganic salt is the fluoride, chloride, bromide or iodide salt of K, Cs or Ca.

9. The method of claim 6 wherein said compressing step takes place at a pressure ranging from about 10,000 psi to about 50,000 psi.

10. The method of claim 6 wherein said method further comprises the step of coating the solid body with a sealant to ensure chemical and dimensional stability.

* * * * *